United States Patent
Lee et al.

(10) Patent No.: US 9,215,117 B2
(45) Date of Patent: Dec. 15, 2015

(54) AMPLITUDE SHIFT KEYING DEMODULATOR AND COMMUNICATION APPARATUS INCLUDING THE SAME

(71) Applicant: SAMSUNG ELECTRONICS CO., LTD., Suwon-si, Gyeonggi-do (KR)

(72) Inventors: Sang Hyo Lee, Incheon (KR); Su Hwan Kim, Seoul (KR); Ji Sung Kim, Seoul (KR)

(73) Assignees: SAMSUNG ELECTRONICS CO., LTD., Suwon-Si, Gyeonggi-Do (KR); SEOUL NATIONAL UNIVERSITY INDUSTRY FOUNDATION, Seoul (KR)

( * ) Notice: Subject to any disclaimer, the term of this patent is extended or adjusted under 35 U.S.C. 154(b) by 0 days.

(21) Appl. No.: 14/599,729

(22) Filed: Jan. 19, 2015

(65) Prior Publication Data

US 2015/0256370 A1    Sep. 10, 2015

(30) Foreign Application Priority Data

Mar. 4, 2014  (KR) ........................ 10-2014-0025668

(51) Int. Cl.
*H04B 1/38* (2015.01)
*H04L 27/06* (2006.01)
*H04L 7/04* (2006.01)

(52) U.S. Cl.
CPC . *H04L 27/06* (2013.01); *H04L 7/04* (2013.01)

(58) Field of Classification Search
CPC ....... H04L 27/06; H04L 7/04; H04L 25/4927; H04L 5/1438; H04L 27/2608; H04L 27/38; H04L 27/3809; H04L 27/3827; H04M 11/06; H04M 11/062
USPC ................................................ 375/222, 320
See application file for complete search history.

(56) References Cited

U.S. PATENT DOCUMENTS

| 6,213,402 | B1 | 4/2001 | Reiner |
| 6,307,428 | B1 | 10/2001 | Nebel et al. |
| 6,343,022 | B1* | 1/2002 | Naruse ............................ 363/16 |
| 7,885,359 | B2 | 2/2011 | Meltzer |

(Continued)

FOREIGN PATENT DOCUMENTS

| JP | 08-251240 | 9/1996 |
| JP | 2004-158960 | 6/2004 |
| KR | 1020120071878 | 7/2012 |

OTHER PUBLICATIONS

Tzung-Je Lee, "All-MOS ASK Demodulator for Low-Frequency Applications" IEEE Transactions on Circuits and Systems II: Express Briefs, vol. 55, Issue: 5, Publication Year: 2008, pp. 474-478.*

(Continued)

*Primary Examiner* — Juan A Torres
(74) *Attorney, Agent, or Firm* — F. Chau & Associates, LLC

(57) ABSTRACT

An amplitude shift keying (ASK) demodulator and a communication apparatus including the same are provided. The ASK demodulator includes an envelope detector, a clock generator, a plurality of elementary demodulators, and a post signal processor. The envelope detector is configured to detect an envelope of an ASK modulated signal and to generate an envelope signal. The clock generator is configured to generate a main clock signal and first through n-th clock signals, where n is a positive integer of at least 2. The plurality of elementary demodulators are each configured to sample the envelope signal using a first sampling clock signal and a second sampling clock signal, and to output first through n-th elementary demodulated signals based on a difference between the sampled envelope signals using the first sampling clock signal and the second sampling clock signal. The post signal processor is configured to generate a final demodulated signal using at least one of the first through n-th elementary demodulated signals.

20 Claims, 11 Drawing Sheets

(56) References Cited

U.S. PATENT DOCUMENTS

| | | | |
|---|---|---|---|
| 7,907,005 B2 | 3/2011 | Kranabenter | |
| 8,472,560 B2 | 6/2013 | Rezayee et al. | |
| 8,711,982 B1 * | 4/2014 | Cai et al. | 375/320 |
| 2001/0013814 A1 * | 8/2001 | Arisawa | 332/115 |
| 2005/0094745 A1 * | 5/2005 | Miyanaga et al. | 375/320 |
| 2006/0023796 A1 | 2/2006 | Yanagida et al. | |
| 2008/0252367 A1 | 10/2008 | Pettersen et al. | |
| 2009/0189688 A1 * | 7/2009 | Nehrig et al. | 329/311 |
| 2010/0158157 A1 * | 6/2010 | Iwata et al. | 375/320 |
| 2011/0244811 A1 | 10/2011 | Kargl et al. | |

OTHER PUBLICATIONS

Choi Myoeng-Jae, "Design of low power ASK CMOS demodulator circuit for RFID tag: Design of All-MOSFET low power ASK demodulator," 2010 IEEE International Conference of Electron Devices and Solid-State Circuits (EDSSC), Publication Year: 2010, pp. 1-4.*

Bin Liang, "An ASK demodulator for data telemetry in biomedical application," Annual International Conference of the IEEE Engineering in Medicine and Biology Society, 2009, EMBC 2009, Publication Year: 2009, pp. 1561-1564.*

Yueh-Hua Yu, "An LTPS TFT Demodulator for RFID Tags Embeddable on Panel Displays," IEEE Transactions on Microwave Theory and Techniques, vol. 57, Issue: 5, Part: 2, Publication Year: 2009, pp. 1356-1361.*

* cited by examiner

AMPLITUDE SHIFT KEYING DEMODULATOR AND COMMUNICATION APPARATUS INCLUDING THE SAME

CROSS-REFERENCE TO RELATED APPLICATION

This application claims priority under 35 U.S.C. §119(a) to Korean Patent Application No. 10-2014-0025668, filed on Mar. 4, 2014, in the Korean Intellectual Property Office, the disclosure of which is incorporated by reference herein in its entirety.

TECHNICAL FIELD

The present inventive concept relates to a communication apparatus, and more particularly, to an amplitude shift keying (ASK) demodulator and a communication apparatus including the same.

DISCUSSION OF THE RELATED ART

A Very High Bit Rate (VHBR) technology has recently been standardized and deployed to accelerate data transfer between electronic devices. When VHBR is used in a contactless smart card system, the data rate may be increased up to, e.g., 6.8 Mbps. When such high data rate is implemented using amplitude shift keying (ASK) modulation scheme in the contactless smart card system, signal distortion of the ASK modulated signals may occur.

SUMMARY

According to an exemplary embodiment of the present inventive concept, there is provided an amplitude shift keying (ASK) demodulator. The demodulator includes an envelope detector, a clock generator, a plurality of elementary demodulators, and a post signal processor. The envelope detector is configured to detect an envelope of an ASK modulated signal and to generate an envelope signal. The clock generator is configured to generate a main clock signal and first through n-th clock signals, where n is a positive integer of at least 2. The plurality of elementary demodulators is each configured to sample the envelope signal using a first sampling clock signal and a second sampling clock signal and to output first through n-th elementary demodulated signals based on a difference between the sampled envelope signals using the first sampling clock signal and the second sampling clock signal. The post signal processor is configured to generate a final demodulated signal using at least one of the first through n-th elementary demodulated signals.

The main clock signal includes n pulses in a predetermined unit period. The first through n-th clock signals have different phases to one another. Each of the first through n-th clock signals have a frequency equal to a 1/n frequency of the main clock signal.

The predetermined unit period may be an elementary time unit (etu) or a bit duration time. The first and second sampling clock signals may be selected from among the first through n-th clock signals, and the first through n-th clock signals may be obtained by dividing the frequency of the main clock signal.

The clock generator may generate the main clock signal and the first through n-th clock signals from a carrier signal of the ASK modulated signal.

The plurality of elementary demodulators may include first through n-th elementary demodulators for outputting the first through n-th elementary demodulated signals, respectively. The first sampling clock signal and the second sampling clock signal for the m-th elementary demodulator may be the (m+1)-th clock signal and the m-th clock signal, respectively, among the first through n-th clock signals, where m is an integer in a range of 1 to (n−1). The first sampling clock signal and the second sampling clock signals for the n-th elementary demodulator may be the first clock signal and the n-th clock signal, respectively, among the first through n-th clock signals.

Each of the first through n-th elementary demodulators may include a sample-and-hold comparator and a latch. The sample-and-hold comparator may be configured to sample the envelope signal using the first and second sampling clock signals and to output a comparison result signal corresponding to the difference between the sampled envelope signals using the first sampling clock signal and the second sampling clock signal. The latch may be configured to latch the comparison result signal output from the sample-and-hold comparator.

The post signal processor may include a selector and a combiner. The selector may be configured to select two demodulated signals from among the first through n-th elementary demodulated signals. The combiner may be configured to generate the final demodulated signal by combining the selected two demodulated signals. The selected two demodulated signals may be the (k+1)-th elementary demodulated signal and the (k+2)-th elementary demodulated signal when the k-th elementary demodulated signal is an earliest elementary demodulated signal having a logic level transition among the first through n-th elementary demodulated signals, where k is an integer in a range of 1 to (n−2). The selected two demodulated signals may be the n-th elementary demodulated signal and the first elementary demodulated signal when the (n−1)-th elementary demodulated signal is an earliest elementary demodulated signal having a logic level transition among the first through n-th elementary demodulated signals. The selected two demodulated signals may be the (n−1)-th elementary demodulated signal and the n-th elementary demodulated signal when the (n−2)-th elementary demodulated signal is an earliest elementary demodulated signal having a logic level transition among the first through n-th elementary demodulated signals.

The post signal processor may further include a finite state machine and an initialization signal generator. The finite state machine may be configured to detect a start of frame (SOF), an end of frame (EOF), or an extra guard time (EGT) from the final demodulated signal and to generate a state signal. The initialization signal generator may be configured to generate an initialization signal for initializing the first through n-th elementary demodulators based on the state signal and the final demodulated signal.

The initialization signal generator may include a set signal generator and a reset signal generator. The set signal generator may be configured to generate a set signal. The reset signal generator may be configured to generate a reset signal. The latch may operate in response to the set signal and the reset signal.

The post signal processor may be configured to generate the final demodulated signal by selecting a signal from among the first through n-th elementary demodulated signals, or by combining at least two demodulated signals among the first through n-th elementary demodulated signals.

According to an exemplary embodiment of the present inventive concept, there is provided a communication apparatus. The communication apparatus includes an antenna, a transmit module, and a receive module. The transmit module includes an amplitude shift keying (ASK) modulator configured to perform ASK modulation on an input signal according to a control of a control logic. The receive module includes an ASK demodulator configured to receive an ASK modulated signal via the antenna and to demodulate the ASK modulated signal. The ASK demodulator includes an envelope detector, a plurality of elementary demodulators, and a post signal processor. The envelope detector is configured to detect an envelope of the ASK modulated signal and to generate an envelope signal. The plurality of elementary demodulators is each configured to sample the envelope signal using a first sampling clock signal and a second sampling clock signal, and to output first through n-th elementary demodulated signals based on a difference between the sampled envelope signals using the first sampling clock signal and the second sampling clock signal. The post signal processor is configured to generate a final demodulated signal using at least one of the first through n-th elementary demodulated signals. The first and second sampling clock signals are selected from among first through n-th clock signals for sampling the envelope signal n times during a predetermined unit period, where n is a positive integer of at least 2.

The ASK demodulator may further include a clock generator configured to generate a main clock signal and the first through n-th clock signals from a carrier signal of the ASK modulated signal. The main clock signal may include n pulses in the redetermined unit period. Each of the first through n-th clock signals may have a frequency equal to a 1/n frequency of the main clock signal. The first through n-th clock signals may have different phases to one another.

The first through n-th clock signals may be obtained by dividing the frequency of the main clock signal and the plurality of elementary demodulators may include first through n-th elementary demodulators.

The first sampling clock signal and the second sampling clock signal for the m-th elementary demodulator may be the (m+1)-th clock signal and the m-th clock signal, respectively, among the first through n-th clock signals, where m is an integer in a range of 1 to (n−1). The first sampling clock signal and the second sampling clock signals for the n-th elementary demodulator may be the first clock signal and the n-th clock signal, respectively, among the first through n-th clock signals.

Each of the first through n-th elementary demodulators may include a sample-and-hold comparator and a latch. The sample-and-hold comparator may be configured to sample the envelope signal using the first and second sampling clock signals and to output a comparison result signal corresponding to the difference between the sampled envelope signals using the first sampling clock signals and second sampling clock signal. The latch may be configured to latch the comparison result signal output from the sample-and-hold comparator.

The post signal processor may be configured to generate the final demodulated signal by selecting a signal from among the first through n-th elementary demodulated signals, or by combining at least two demodulated signals among the first through n-th elementary demodulated signals.

The post signal processor may further include a finite state machine and an initialization signal generator. The finite state machine may be configured to detect a start of frame (SOF), an end of frame (EOF), or an extra guard time (EGT) from the final demodulated signal and to generate a state signal. The initialization signal generator may be configured to generate an initialization signal for initializing the first through n-th elementary demodulators based on the state signal and the final demodulated signal.

The predetermined time period may be an elementary time unit defined in an ISO/IEC 14443 standard, or a portion of the elementary time unit.

The communication apparatus may be a smart card device or a smart card reader for reading information of the smart card device, which complies with the ISO/IEC 14443 standard.

According to an exemplary embodiment of the present inventive concept, there is provided an amplitude shift keying (ASK) demodulator. The demodulator includes first through n-th elementary demodulators, where n is a positive integer. An m-th elementary demodulator of the first through n-th elementary demodulators (where m is an integer in a range of 1 to n) is configured to receive an envelope signal of an ASK modulated signal and to output a final demodulated signal. The m-th elementary demodulator includes a sampler and a comparator. The sampler is configured to sample the envelope signal using a first sampling clock signal and a second sampling clock signal. The comparator is configured to determine a first difference between the sampled envelope signals using the first sampling clock signal and the second sampling clock signal, and to output a comparison result signal corresponding to the first difference between the sampled envelope signals. The comparator includes a first comparator and a second comparator. The first comparator is configured to output a logic high level when the first difference is a positive value. The second comparator is configured to output a logic high level when the first difference is a negative value. The first sampling clock signal and the second sampling clock signal when m is an integer in a range of 1 to (n−1) are the (m+1)-th clock signal and the m-th clock signal, respectively, among the first through n-th clock signals. The first sampling clock signal and the second sampling clock signals when m is equal to n, are the first clock signal and the n-th clock signal, respectively, among the first through n-th clock signals. The first through n-th clock signals have different phases to one another. Each of the first through n-th clock signals has a frequency equal to a 1/n frequency of the main clock signal.

The sampler may include first through third switches and a capacitor. The first switch may be configured to bypass the envelope signal to a first node in response to a logic high level of the first sampling clock signal. The second switch may be connected to the first switch in parallel. The second switch may be configured to bypass the envelope signal to the first node in response to a logic high level of the second sampling clock signal. The capacitor may be connected between the first node and a second node. The third switch may be connected between the second node and a third node. The third switch may be configured to be turned on in response to a logic low level of the second sampling clock signal. The third node may be applied with a reference voltage. The comparator may be configured to determine the first difference using a voltage at the second node and the reference voltage at the third node.

BRIEF DESCRIPTION OF THE DRAWINGS

The above and other features of the present inventive concept will become more apparent by describing in detail exemplary embodiments thereof with reference to the attached drawings in which.

DETAILED DESCRIPTION OF THE EMBODIMENTS

Figure 1:
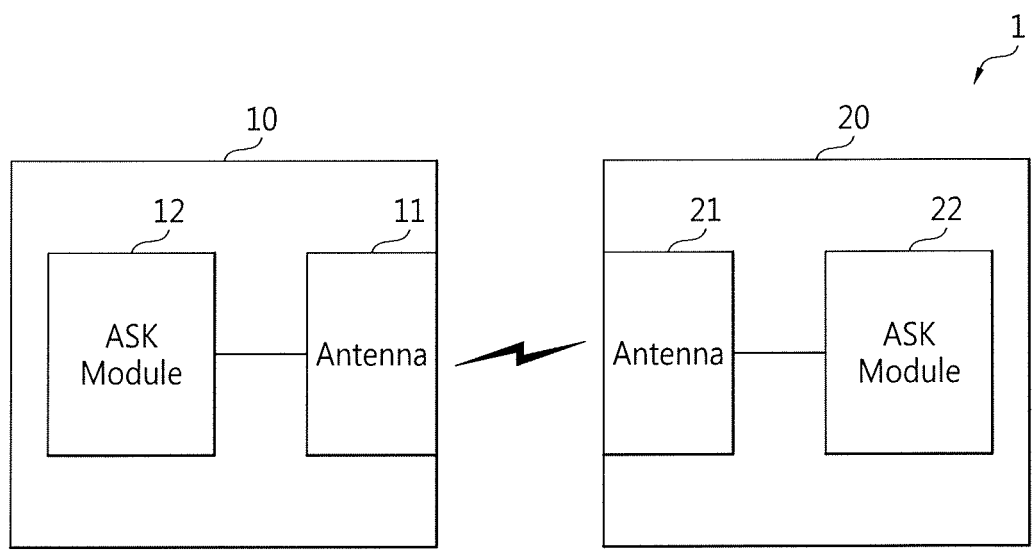
FIG. 1 is a block diagram of a contactless communication system according to an exemplary embodiment of the present inventive concept.

The present inventive concept will now be described more fully hereinafter with reference to the accompanying drawings, in which exemplary embodiments thereof are shown. This present inventive concept may, however, be embodied in many different forms and should not be construed as limited to the embodiments set forth herein. In the drawings, the size and relative sizes of layers and regions may be exaggerated for clarity. Like numbers may refer to like elements throughout the specification and drawings.

It will be understood that when an element is referred to as being "connected" or "coupled" to another element, it can be directly connected or coupled to the other element or intervening elements may be present.

As used herein, the singular forms "a", "an" and "the" are intended to include the plural forms as well, unless the context clearly indicates otherwise.

FIG. 1 is a block diagram of a contactless communication system 1 according to an exemplary embodiment of the present inventive concept. The contactless communication system 1 includes a first communication apparatus 10 and a second communication apparatus 20. The first and second communication apparatuses 10 and 20 may perform contactless communication according to the ISO/IEC 14443 standard, but the present inventive concept is not restricted thereto. The first communication apparatus 10 may include an antenna 11 and an ASK module 12. The second communication apparatus 20 may include an antenna 21 and an ASK module 22.

Each of the ASK modules 12 and 22 may include an ASK modulator (e.g., 100 in FIG. 2) that performs ASK modulation on input data or an ASK demodulator (e.g., 200 in FIG. 2) that demodulates the ASK modulated signal. The ASK module 12 of the first communication apparatus 10 outputs an ASK modulated signal generated from original data, and transmits the ASK modulated signal to the second communication apparatus 20 via the antenna 11. The ASK module 22 receives the ASK modulated signal via the antenna 21 and may restore the original data by demodulating the ASK modulated signal. In addition, an ASK modulated signal output from the ASK module 22 of the second communication apparatus 20 may be demodulated by the ASK module 12 of the first communication apparatus 10 back through the above-described procedure.

Figure 2:
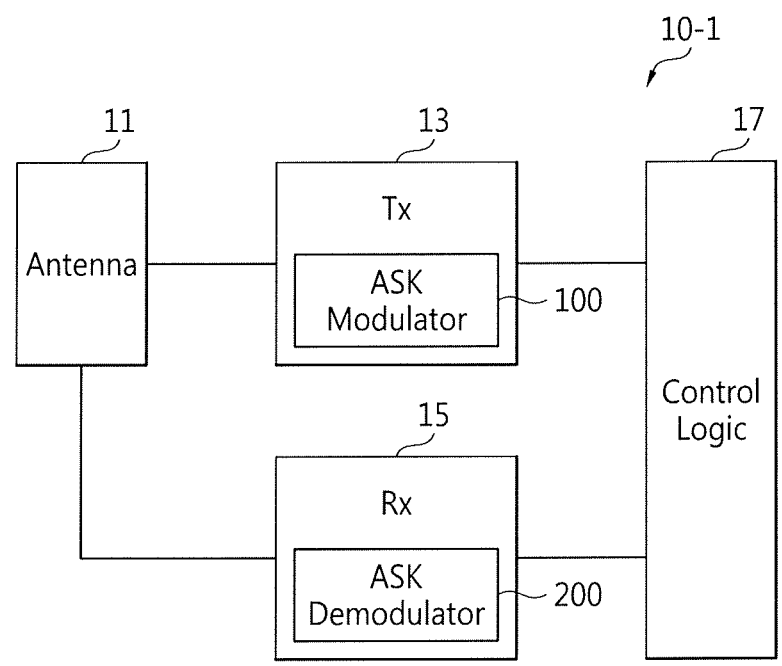
FIG. 2 is a block diagram of a first communication apparatus illustrated in FIG. 1 according to an exemplary embodiment of the present inventive concept.

FIG. 2 is a block diagram of a first communication apparatus 10-1 illustrated in FIG. 1 according to an exemplary embodiment of the present inventive concept. Referring to FIG. 2, the first communication apparatus 10-1 may include the antenna 11, a transmit (Tx) module 13, a receive (Rx) module 15, and a control logic 17.

The Tx module 13 may include the ASK modulator 100 and the Rx module 15 may include the ASK demodulator 200. The Tx module 13 may perform ASK modulation on data and output an ASK modulated signal according to a control of the control logic 17. The ASK modulated signal may be transmitted to another communication apparatus (not shown) via the antenna 11. An ASK modulated signal output from another communication apparatus may be input to the ASK demodulator 200 of the Rx module 15 via the antenna 11, demodulated by the ASK demodulator 200, and then input to the control logic 17.

For example, the first communication apparatus 10-1 may be a smart card device or a smart card reader, which complies with the ISO/IEC 14443 standard, but the present inventive concept is not restricted thereto.

Figure 3:
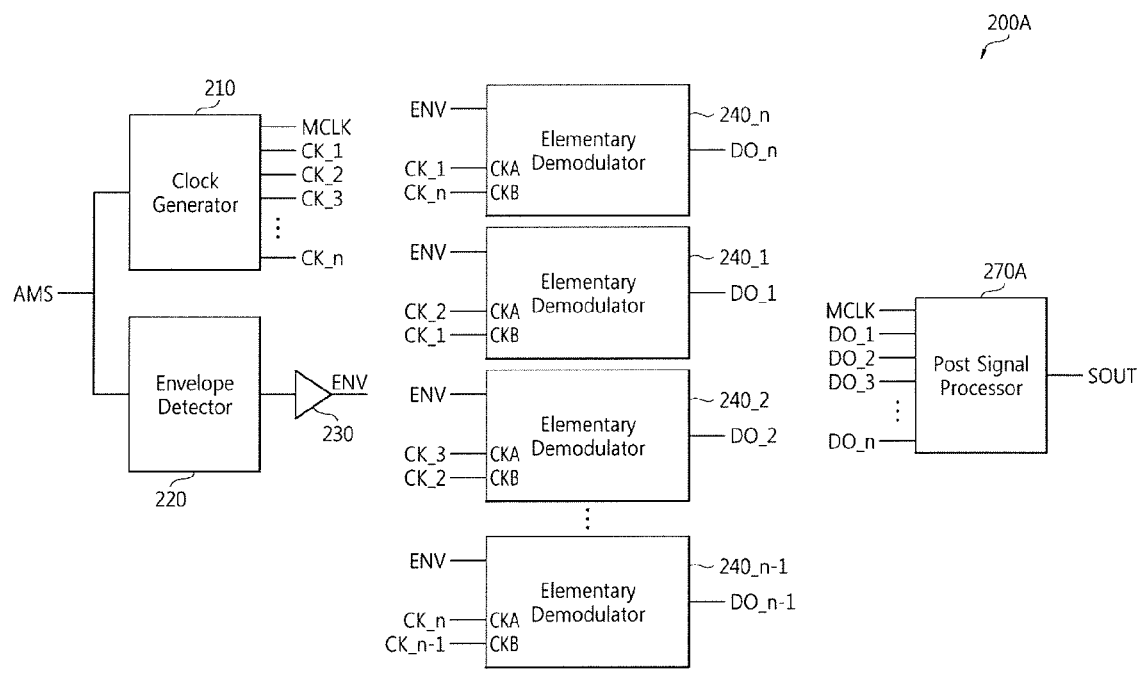
FIG. 3 is a block diagram of an amplitude shift keying (ASK) demodulator according to an exemplary embodiment of the present inventive concept.
Figure 4:
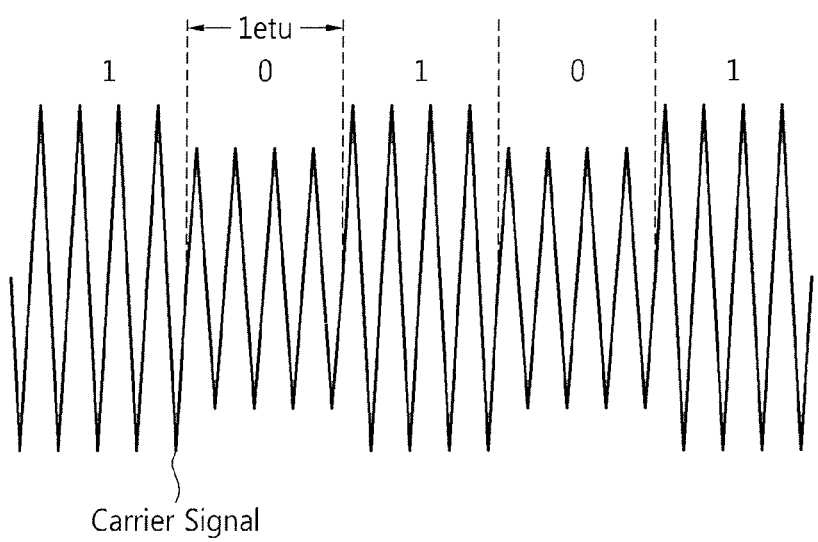
FIG. 4 is a waveform diagram of an ASK modulated signal according to an exemplary embodiment of the present inventive concept.
Figure 5:
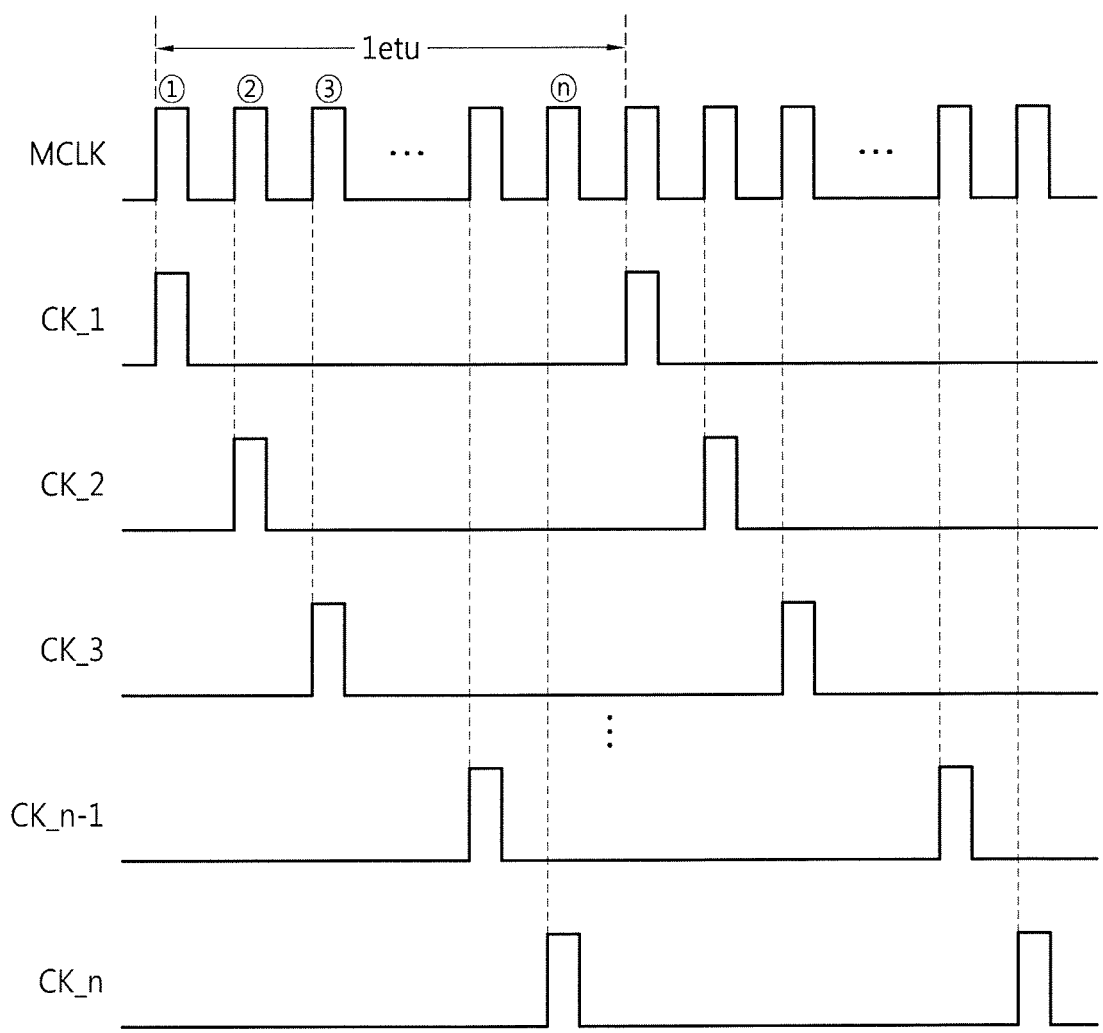
FIG. 5 are waveform diagrams of a main clock signal and first through n-th clock signals illustrated in FIG. 3 according to an exemplary embodiment of the present inventive concept.

FIG. 3 is a block diagram of an ASK demodulator 200A according to an exemplary embodiment of the present inventive concept. FIG. 4 is a waveform diagram of an ASK modulated signal according to an exemplary embodiment of the present inventive concept. FIG. 5 are waveform diagrams of a main clock signal MCLK and first through n-th clock signals CK_1 through CK_n, where "n" is a positive integer of at least 2, illustrated in FIG. 3 according to an exemplary embodiment of the present inventive concept. Referring to FIGS. 3 through 5, the ASK demodulator 200A includes a clock generator 210, an envelope detector 220, first through n-th elementary demodulators 240_1 through 240_n, and a post signal processor 270A.

The envelope detector 220 detects an envelope of an ASK modulated signal AMS and generates an envelope signal ENV. For instance, a data string of "10101" may be modulated into the ASK modulated signal AMS using a carrier signal, as shown in FIG. 4. Here, one elementary time unit (etu) or the bit duration time of one bit may be the amount of time a "1" level or a "0" level is held. A buffer 230 that buffers the envelope signal ENV may be connected to an output terminal of the envelope detector 220.

The clock generator 210 may generate the main clock signal MCLK and the first through n-th clock signals CK_1 through CK_n. The clock generator 210 may generate the main clock signal MCLK and the first through n-th clock signals CK_1 through CK_n from the carrier signal of the ASK modulated signal AMS according to an exemplary embodiment of the present inventive concept, but the present inventive concept is not restricted thereto. For instance, according to an exemplary embodiment of the present inventive concept, the clock generator 210 may generate the main clock signal MCLK having a predetermined frequency and generate the first through n-th clock signals CK_1 through CK_n by dividing the phase and frequency of the main clock signal MCLK. The main clock signal MCLK may have "n" pulses per one etu, as shown in FIG. 4, but the present inventive concept is not restricted thereto. For instance, the main clock signal MCLK may have "n" pulses per a predetermined unit period (e.g., a sub etu which will be described later).

One etu may be an integer multiple of a period of a carrier signal, such as 128/fc, 16/fc, 8/fc, 4/fc, or the like, but it is not restricted thereto. Here, fc indicates a frequency of the carrier signal and 1/fc is the period of the carrier signal.

The first through n-th clock signals CK_1 through CK_n may have a 1/n frequency of the main clock signal MCLK and have different phases from each other. For instance, as shown in FIG. 5, the first through n-th clock signals CK_1 through CK_n may be results of dividing the main clock signal MCLK to have a same frequency (e.g., 1/n frequency of the main clock signal MCLK) and equally spaced different phases. For instance, the first through n-th clock signals CK_1 through CK_n may be respectively based on first through n-th pulses ①through ⓝ during one etu of the main clock signal MCLK.

Each of the first through n-th elementary demodulators 240_1 through 240_n samples the envelope signal ENV using a first sampling clock signal CKA and a second sampling clock signal CKB and the first through n-th elementary demodulators 240_1 through 240_n output first through n-th elementary demodulated signals DO_1 through DO_n, respectively, based on a difference between the sampled envelope signals. The first and second sampling clock signals CKA and CKB are two signals selected from among the first through n-th clock signals CK_1 through CK_n.

For instance, for the m-th elementary demodulator 240_m (where "m" is an integer in a range of 1≤m≤n), the (m+1)-th clock signal CK_m+1 and the m-th clock signal CK_m may be selected as the first and second sampling clock signals CKA and CKB from among the first through n-th clock signals CK_1 through CK_n. For instance, when m=1, the first elementary demodulator 240_1 may receive the second clock signal CK_2 as the first sampling clock signal CKA and the first clock signal CK_1 as the second sampling clock signal CKB. In addition, the first elementary demodulator 240_1 may detect whether a difference (e.g., ENV.b−ENV.a) between an envelope signal ENV.a sampled using the first sampling clock signal CKA and an envelope signal ENV.b sampled using the second sampling clock signal CKB is a positive value or a negative value (e.g., whether the envelope signal ENV.b sampled using the second sampling clock signal CKB is greater than the envelope signal ENV.a sampled using the first sampling clock signal CKA). The first elementary demodulator 240_1 may output the first elementary demodulated signal DO_1 based on the detection result.

When m=2, similarly to the first elementary demodulator 240_1, the second elementary demodulator 240_2 may receive the third clock signal CK_3 as the first sampling clock signal CKA and the second clock signal CK_2 as the second sampling clock signal CKB. The second elementary demodulator 240_2 may detect whether the difference (e.g., ENV.b−ENV.a) between the envelope signal ENV.a sampled using the first sampling clock signal CKA and the envelope signal ENV.b sampled using the second sampling clock signal CKB is a positive value or a negative value. The second elementary demodulator 240_2 may output the second elementary demodulated signal DO_2 based on the detection result.

When m=n, similarly to the first elementary demodulator 240_1, the n-th elementary demodulator 240_n may receive the first clock signal CK_1 corresponding to an (m+1)-th clock signal as the first sampling clock signal CKA and the n-th clock signal CK_n corresponding to the m-th clock signal CK_m as the second sampling clock signal CKB. The n-th elementary demodulator 240 may detect whether the difference (e.g., ENV.b−ENV.a) between the envelope signal ENV.a sampled using the first sampling clock signal CKA and the envelope signal ENV.b sampled using the second sampling clock signal CKB is a positive value or a negative value. The n-th elementary demodulator 240 may output the n-th elementary demodulated signal DO_n based on the detection result.

Figure 6A:
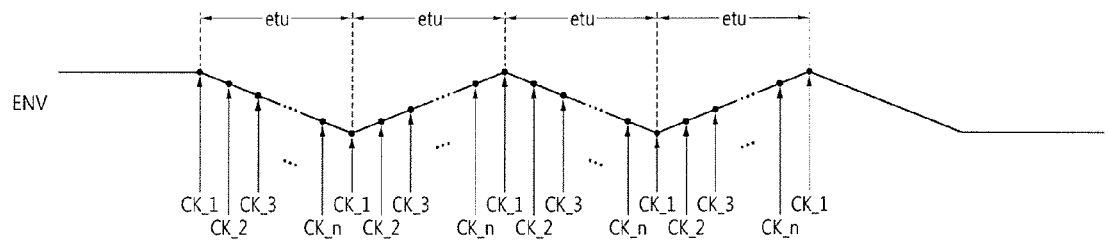
FIGS. 6A and 6B are diagrams illustrating an operation of the ASK demodulator illustrated in FIG. 3.
Figure 6B:
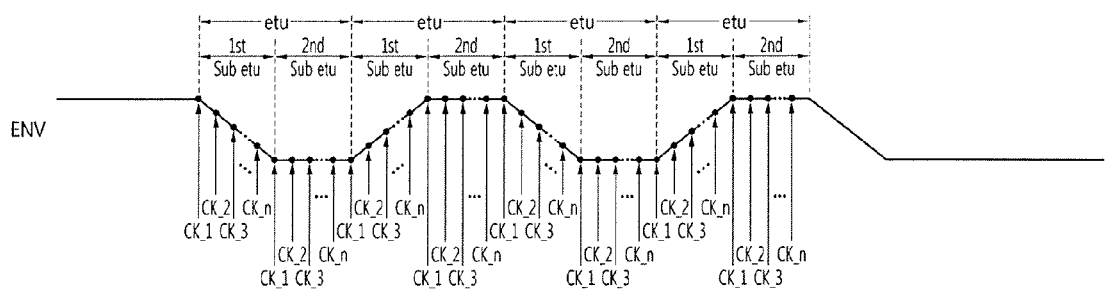

FIGS. 6A and 6B are diagrams illustrating an operation of the ASK demodulator 200A illustrated in FIG. 3. Referring to FIG. 6A, the envelope signal ENV may be sampled n times during an etu (e.g., one bit period of the envelope signal ENV). Each sample signal may be compared with another sample signal spaced by an interval of (n−1) and thus, an elementary demodulated signal may be generated. The "n" times of sampling may be performed using the first through n-th clock signals CK_1 through CK_n. For instance, referring to FIG. 6A, a signal sampled using the first clock signal CK_1 in a first etu may be compared with a signal sampled using the n-th clock signal CK_n in the first etu, a signal sampled using the second clock signal CK_2 in the first etu may be compared with a signal sampled using the first clock signal CK_1 in a second etu, and a signal sampled using the third clock signal CK_3 in the first etu may be compared with a signal sampled using the second clock signal CK_2 in the second etu.

Referring to FIG. 6A, the first through n-th clock signals CK_1 through CK_n may have an equally spaced different phases so that each etu of the envelope signal ENV is sampled "n" times at uniform intervals, as shown in FIG. 5. In addition, the first through n-th elementary demodulators 240_1 through 240_n may output the elementary demodulated signals DO_1 through DO_n in each etu. For instance, the elementary demodulated signals DO_1 through DO_n correspond to the n sampled envelope signal ENV.

Referring to FIG. 6B, each etu may be divided into at least two sub etu (e.g., a 1st sub etu and a 2nd sub etu) and the first through n-th clock signals CK_1 through CK_n may be generated in each sub etu. For instance, the first through n-th clock signals CK_1 through CK_n may have equally spaced different phases so that each sub etu (e.g., 1st sub etu and 2nd sub etu) is sampled "n" times at uniform intervals. Thus, the envelope signal ENV is sampled 2n times during each etu (e.g., one bit period) and each of the 2n times sample signals may be compared with another sample signal spaced by an interval of (n−1) to generate an elementary demodulated signal.

For instance, a signal sampled using the first clock signal CK_1 in the first sub etu may be compared with a signal sampled using the n-th clock signal CK_n in the first sub etu, a signal sampled using the second clock signal CK_2 in the first sub etu may be compared with a signal sampled using the first clock signal CK_1 in the second sub etu, and a signal sampled using the third clock signal CK_3 in the first sub etu may be compared with a signal sampled using the second clock signal CK_2 in the second sub etu. In addition, the first through n-th elementary demodulators 240_1 through 240_n may output the elementary demodulated signals DO_1 through DO_n in each sub etu.

Figure 7:
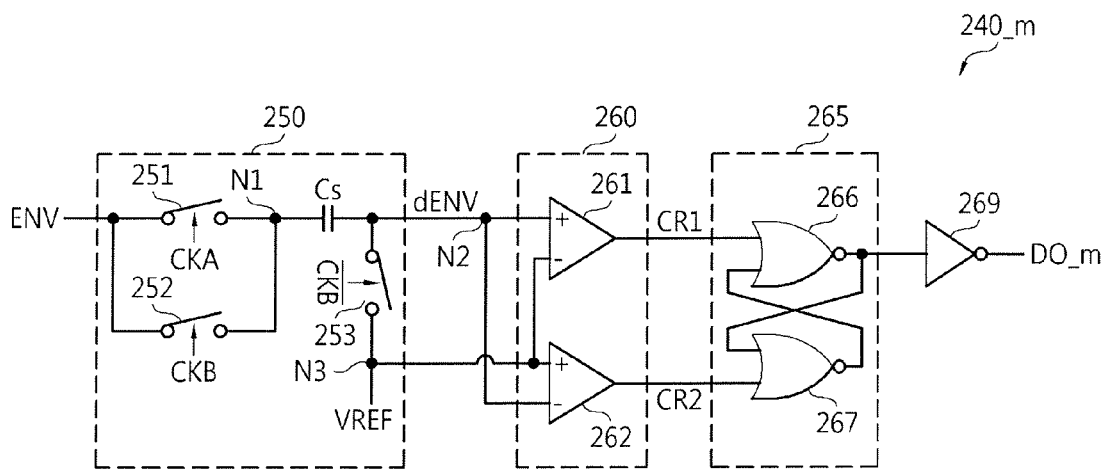
FIG. 7 is a circuit diagram of an elementary demodulator illustrated in FIG. 3 according to an exemplary embodiment of the present inventive concept.
Figure 8:
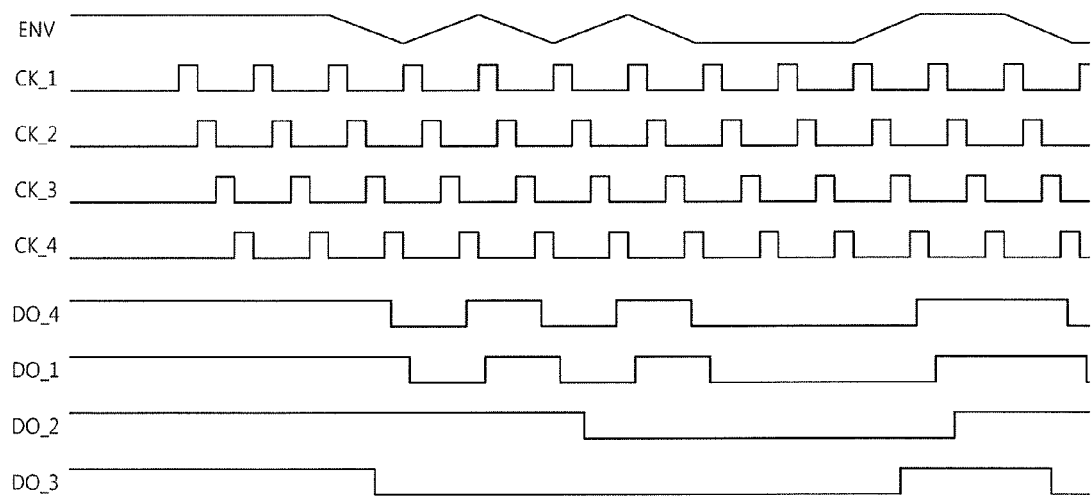
FIG. 8 is a timing chart illustrating an operation of the elementary demodulator illustrated in FIG. 7 when "n" is 4.

FIG. 7 is a circuit diagram of an elementary demodulator 240_m (where "m" is an integer in a range of 1 to "n") illustrated in FIG. 3 according to an exemplary embodiment of the present inventive concept. FIG. 8 is a timing chart illustrating an operation of the elementary demodulator 240_m illustrated in FIG. 7 when "n" is 4. Referring to FIGS. 7 through 8, the elementary demodulator 240_m may include a sample-and-hold comparator, a latch 265, and an inverter 269.

The sample-and-hold comparator samples the envelope signal ENV using the first sampling clock signal CKA and the second sampling clock signal CKB, compares the sampled signals with each other, and outputs comparison result signals CR1 and CR2. The sample-and-hold comparator includes a sampler 250 and a comparator 260.

The sampler 250 includes first through third switches 251, 252, and 253 and a capacitor Cs, and outputs a difference signal dENV corresponding to a difference between the envelope signal ENV.a using the first sampling clock signal CKA and the envelope signal ENV.b using the second sampling clock signal CKB. The comparator 260 includes a first comparator 261 and a second comparator 262. The first and second comparators 261 and 262 each compare the difference signal dENV with a reference voltage VREF, and output the comparison results signals CR1 and CR2, respectively.

The first and second switches 251 and 252 are turned on (e.g., closed) or turned off (e.g., opened) in response to the first and second sampling clock signals CKA and CKB, respectively. The third switch 253 is turned on or turned off in response to an inverted signal /CKB of the second sampling clock signal CKB. For instance, the first and second sampling clock signals CKA and CKB does not overlap in time. For instance, when the first sampling clock signal CKA has a logic high level (e.g., "1") and the second sampling clock signal CKB has a logic low level (e.g., "0"), the first switch 251 is turned on and the second switch 252 is turned off, the envelope signal ENV is sampled using the first sampling clock signal CKA, and the sampled enveloped signal ENV.a is output to a first node N1. A third node N3 is applied with the reference voltage VREF. Thus, a voltage difference (e.g., VREF−ENV.a) between the envelope signal ENV.a sampled using the first sampling clock signal CKA and the reference voltage VREF may be charged in the capacitor Cs.

In addition, when the second sampling clock signal CKB has a logic high level and the first sampling clock signal CKA has a logic low level, the second switch 252 is turned on and the first switch 251 is turned off, the envelope signal ENV is sampled using the second sampling clock CKB, and the sampled envelope signal ENV.b is output to the first node N1. The third switch 253 is turned off. Accordingly, since the capacitor Cs has been charged with a voltage difference of "VREF−ENV.a", the signal dENV at the second node N2 may have a voltage of "VREF+ENV.b−ENV.a".

The signal dENV at the second node N2 is input to a positive input terminal of the first comparator 261 and a negative input terminal of the second comparator 262. The reference voltage VREF is input to a negative input terminal of the first comparator 261 and a positive input terminal of the second comparator 262.

The first comparator 261 generates the output signal CR1 having a logic high level when the signal dENV (e.g., VREF+ENV.b−ENV.a) at the second node N2 is greater than the reference voltage VREF. For instance, the first comparator 261 generates the output signal CR1 having the logic high level when a difference between the sampled envelope signal ENV.a and the sampled envelope signal ENV.b (e.g., ENV.b−ENV.a) is a positive value. The second comparator 262 generates the output signal CR2 having a logic high level when the signal dENV at the second node N2 is less than the reference voltage VREF. For instance, the second comparator 262 generates the output signal CR2 having the logic high level when the difference between the sampled envelope signal ENV.a and the sampled envelope signal ENV.b (e.g., ENV.b−ENV.a) is a negative value. Thus, the first comparator 261 detects whether a level change between the two sampled envelope signals, e.g., ENV.b−ENV.a is a positive value and the second comparator 262 detects whether a level change between the two sampled envelope signals, e.g., ENV.b−ENV.a is a negative value.

The latch 265 includes a first NOR gate 266 and a second NOR gate 267. The latch 265 latches the signals CR1 and CR2 output from the comparator 260. The latch 265 latches the output signal CR1 of the first comparator 261 to output a logic low level signal when the output signal CR1 is at the logic high level and latches the output signal CR2 of the second comparator 262 to output a high level signal when the output signal CR2 is at the logic high level. The inverter 269 inverts the output signal of the latch 265 and outputs the inverted signal as an elementary demodulated signal DO_m.

Referring to FIGS. 7 and 8, the first through fourth elementary demodulated signals DO_1 through DO_4 may be initially at a logic high level. During the first etu, when the difference (e.g., ENV.b−ENV.a) between the envelope signal ENV.a sampled using the first clock signal CK_1 and the envelope signal ENV.b sampled using the fourth clock signal CK_4 has a negative value, the fourth elementary demodulated signal DO_4 transits to a logic low level. During the second etu, when the difference (e.g., ENV.b−ENV.a) between the envelope signal ENV.a sampled using the first clock signal CK_1 and the envelope signal ENV.b sampled using the fourth clock signal CK_4 has a positive value, the fourth elementary demodulated signal DO_4 transits to the logic high level.

When the difference (e.g., ENV.b−ENV.a) between the envelope signal ENV.a sampled using the second clock signal CK_2 and the envelope signal ENV.b sampled using the first clock signal CK_1 has a negative value, the first elementary demodulated signal DO_1 transits to a logic low level. In addition, when the envelope signal ENV.b sampled using the first clock signal CK_1 becomes higher than the envelope signal ENV.a sampled using the second clock signal CK_2, the first elementary demodulated signal DO_1 transits to the logic high level.

As described above, the fourth and first elementary demodulated signals DO_4 and DO_1 follow a change in the envelope signal ENV for each etu. Accordingly, the fourth and first elementary demodulated signals DO_4 and DO_1 may be signals that restore the envelope signal ENV. However, the second and third elementary demodulated signals DO_2 and DO_3 do not follow the change in the envelope signal ENV for each etu.

The post signal processor 270A selects one signal from among the first through fourth elementary demodulated signals DO_1 through DO_4 or combines at least two signals among the first through fourth elementary demodulated signals DO_1 through DO_4 to generate a final demodulated signal SOUT.

Figure 9:
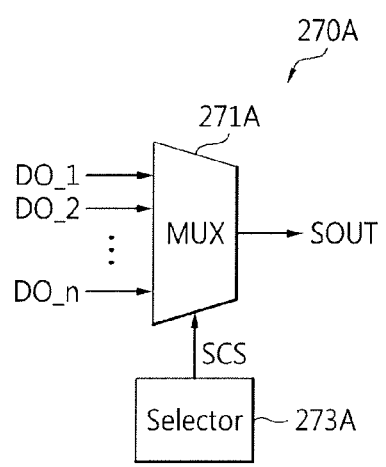
FIG. 9 is a block diagram of a post signal processor illustrated in FIG. 3 according to an exemplary embodiment of the present inventive concept.

FIG. 9 is a block diagram of the post signal processor 270A illustrated in FIG. 3 according to an exemplary embodiment of the present inventive concept. Referring to FIG. 9, the post signal processor 270A includes a multiplexer 271A and a selector 273A.

The selector 273A outputs a selection control signal SCS for selecting a signal from among the first through n-th elementary demodulated signals DO_1 through DO_n. The multiplexer 271A selects a signal from among the first through n-th elementary demodulated signals DO_1 through DO_n in response to the selection control signal SCS and outputs the selected signal as the final demodulated signal SOUT.

For instance, referring to FIGS. 3 and 9, the selector 273A may select the first or fourth elementary demodulated signal DO_1 or DO_4 from among the first through fourth elementary demodulated signals DO_1 through DO_4. The multiplexer 271A may select the first or fourth elementary demodulated signal DO_1 or DO_4 and output the selected signal as the final demodulated signal SOUT.

In the above-described embodiments, the number (e.g., "n") of the elementary demodulators 240_1 through 240_n is the same as the number (e.g., "n") of the first through n-th clock signals CK_1 through CK_n, but the present inventive concept is not restricted to these embodiments and they may be different from each other.

Figure 10:
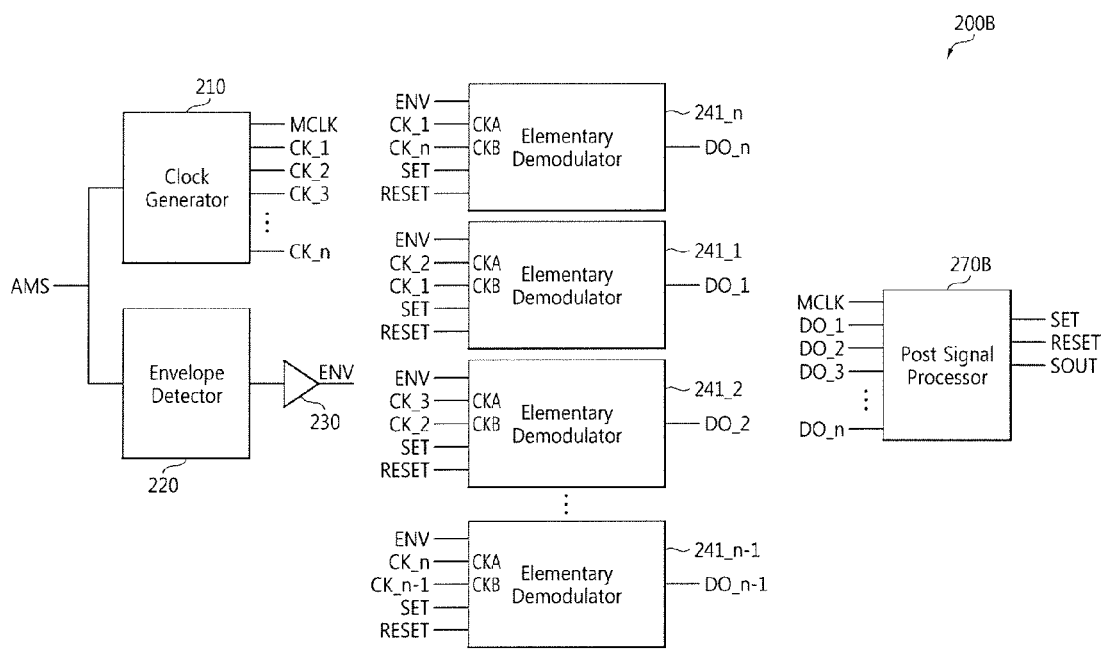
FIG. 10 is a block diagram of an ASK demodulator according to an exemplary embodiment of the present inventive concept.

FIG. 10 is a block diagram of an ASK demodulator 200B according to an exemplary embodiment of the present inventive concept. Referring to FIG. 10, the ASK demodulator 200B includes the clock generator 210, the envelope detector 220, first through n-th (where "n" is an integer of at least 2) elementary demodulators 241_1 through 241_n, and a post signal processor 270B. Since the configuration of the ASK demodulator 200B illustrated in FIG. 10 is similar to that of the ASK demodulator 200A illustrated in FIG. 3, differences therebetween will be described in detail.

The first through n-th elementary demodulators 241_1 through 241_n sample the envelope signal ENV using the first and second sampling clock signals CKA and CKB, compare the difference signal dENV (e.g., VREF+ENV.b−ENV.a) between the sampled signals with the reference voltage VREF, and outputs the first through n-th elementary demodulated signals DO_1 through DO_n. The first through n-th elementary demodulators 241_1 through 241_n initialize the state and/or an output signal of a latch in response to a set signal SET and a reset signal RESET.

According to the ISO/IEC 14443 standard, each duration of a start of frame (SOF), an end of frame (EOF), and an extra guard time (EGT) may not correspond to an integer multiple of an etu. In this case, it is necessary to recognize SOF, EOF, and EGT and initialize output signals.

Figure 16A:
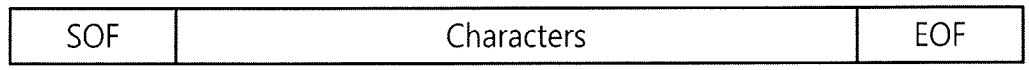
FIGS. 16A through 16D are diagrams of a frame format, a start of frame (SOF), an end of frame (EOF), and a data block according an ISO/IEC 14443 standard.

FIGS. 16A through 16D are diagrams of a frame format, a SOF, an EOF, and a data block according the ISO/IEC 14443 standard. Referring to FIG. 16A, a frame includes a SOF, a data block (e.g., characters), and an EOF. The data block may be interspersed with EGTs.

Figure 16B:
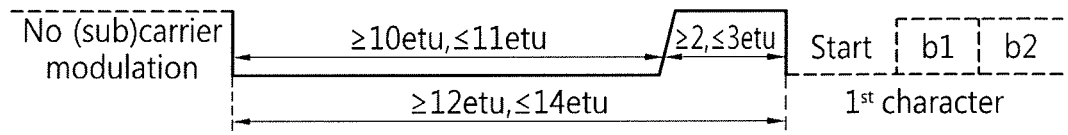
Figure 16C:
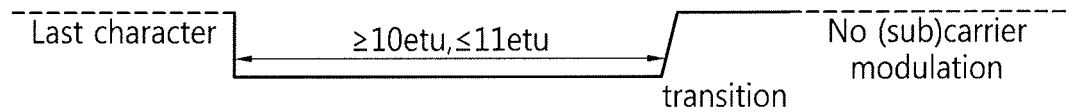
Figure 16D:
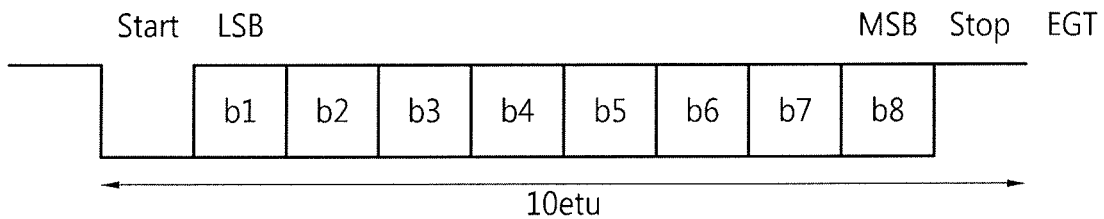

Referring to FIG. 16B, the SOF includes one falling edge, a period of 10 to 11 etu having a logic low level, and a period of 2 to 3 etu having a logic high level. Referring to FIG. 16C, the EOF includes one falling edge, a period of 10 to 11 etu having a logic low level, and one rising edge. Referring to FIG. 16D, the data block includes at least one byte section and an EGT inserted between byte sections. A byte section is used to transmit data of one byte and may include one start bit of "0", eight data bits, and one stop bit of "1".

The post signal processor 270B detects a SOF, an EOF, or an EGT, illustrated in FIGS. 16A through 16C, using the output signals DO_1 through DO_n of the first through n-th elementary demodulators 241_1 through 241_n and the main clock signal MCLK. The post signal processor 270B generates the set signal SET and the rest signal RESET to initialize the first through n-th elementary demodulators 241_1 through 241_n.

Figure 11:
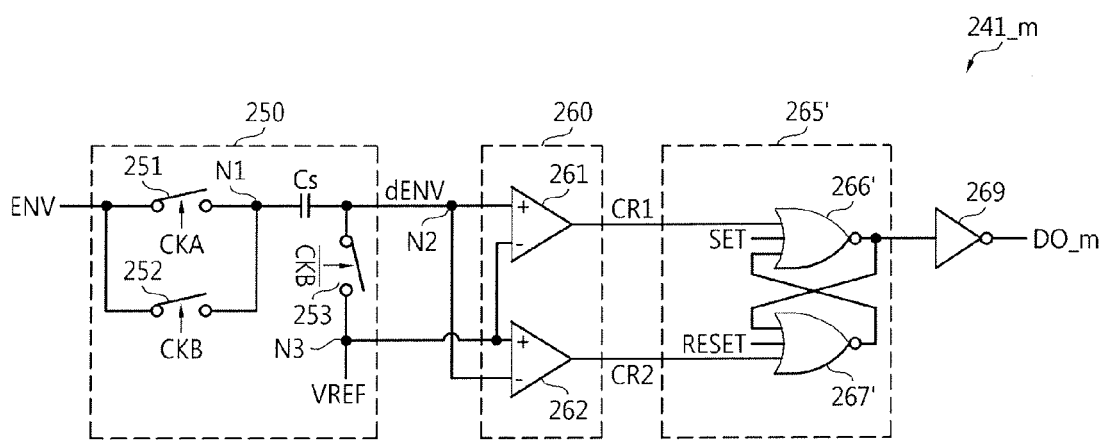
FIG. 11 is a circuit diagram of an elementary demodulator illustrated in FIG. 10 according to an exemplary embodiment of the present inventive concept.

FIG. 11 is a circuit diagram of the elementary demodulator 241_m illustrated in FIG. 10 according to an exemplary embodiment of the present inventive concept. Referring to FIGS. 10 and 11, the elementary demodulator 241_m (where "m" is an integer in a range of 1 to "n") may include the sampler 250, the comparator 260, a latch 265', and an inverter 269. The structure and operation of the elementary demodulator 241_m illustrated in FIG. 11 are similar to those of the elementary demodulator 240_m illustrated in FIG. 7, and therefore, differences therebetween will be described in detail to avoid redundancy.

The latch 265' includes a first NOR gate 266' and a second NOR gate 267'. The first and second NOR gates 266' and 267' receives the set signal SET and the reset signal RESET, respectively. The set signal SET is input to the first NOR gate 266' and the reset signal RESET is input to a second NOR gate 267'. Accordingly, an output signal of the first NOR gate 266' may be initialized to a logic low level in response to the set signal SET at a logic high level and an output signal of the second NOR gate 267' may be initialized to a logic low level in response to the reset signal RESET at a logic high level.

Figure 12:
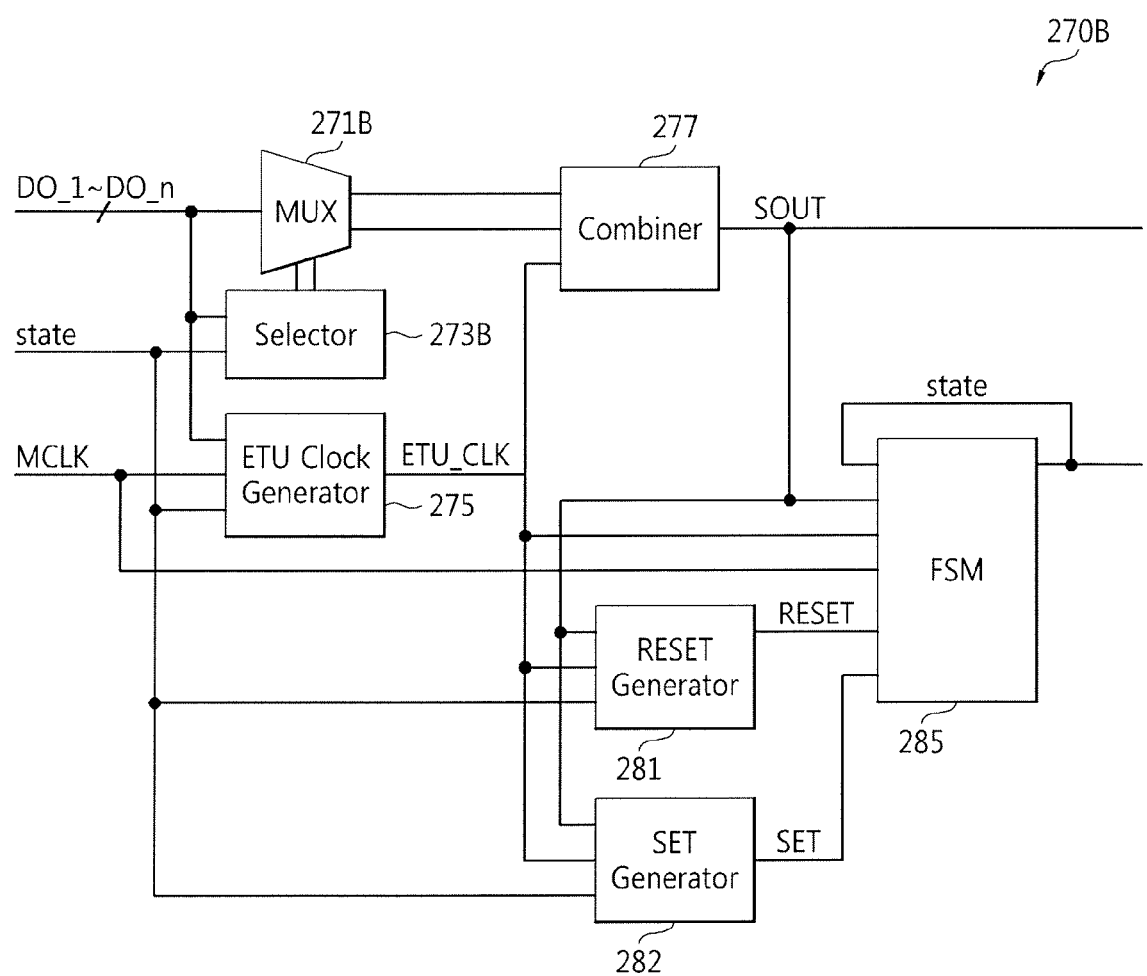
FIG. 12 is a block diagram of a post signal processor illustrated in FIG. 10 according to an exemplary embodiment of the present inventive concept.
Figure 13A:
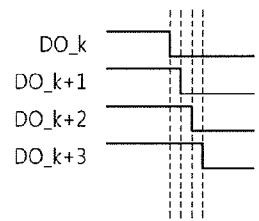
FIGS. 13A through 13D and FIGS. 14A through 14E are waveform diagrams illustrating an operation of the post signal processor illustrated in FIG. 12 according to an exemplary embodiment of the present inventive concept.
Figure 13B:
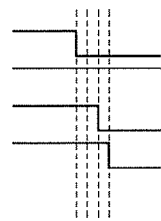
Figure 13C:
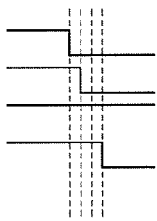
Figure 13D:
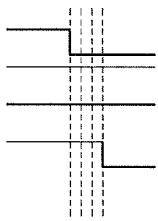
Figure 14A:
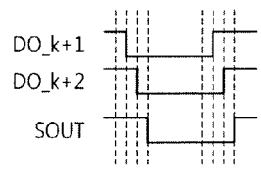
Figure 14B:
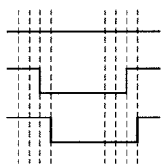
Figure 14C:
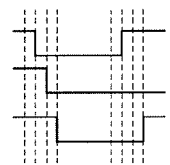
Figure 14D:
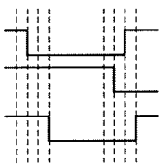
Figure 14E:
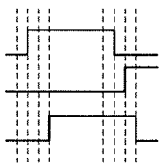

FIG. 12 is a block diagram of the post signal processor 270B illustrated in FIG. 10 according to an exemplary embodiment of the present inventive concept. FIGS. 13A through 13D and FIGS. 14A through 14E are diagrams illustrating an operation of the post signal processor 270B illustrated in FIG. 12 according to an exemplary embodiment of the present inventive concept. Referring to FIG. 10 and FIGS. 12 through 14, the post signal processor 270B may include a selector 273B, a multiplexer 271B, an etu clock generator 275, a combiner 277, an initialization signal generator, and a finite state machine (FSM) 285. The initialization signal generator includes a reset generator 281 and a set generator 282.

The selector 273B may output a selection control signal for selecting two signals from among the first through n-th elementary demodulated signals DO_1 through DO_n. The multiplexer 271B outputs the two signals selected from among the first through n-th elementary demodulated signals DO_1 through DO_n in response to the selection control signal.

When it is assumed that a k-th elementary demodulated signal DO_k (where, "k" is an integer in a range of 1≤k≤n) is an earliest signal that has a level transition (e.g., falling from a logic high level to a logic low level) among the first through n-th elementary demodulated signals DO_1 through DO_n, the selector 273B may select the (k+1)-th elementary demodulated signal DO_k+1 and the (k+2)-th elementary demodulated signal DO_k+2. Various examples of the k-th through (k+3)-th elementary demodulated signals DO_k through DO_k+3 are illustrated in FIGS. 13A through 13D.

The etu clock generator 275 generates an etu clock signal ETU_CLK with a period of etu. Since the etu is an integer multiple (e.g., 4, 8, 16, or 32) of the period of the main clock signal MCLK, the etu clock generator 275 may generate the etu clock signal ETU_CLK by dividing a frequency of the main clock signal MCLK. When the k-th elementary demodulated signal DO_k has a level transition, the etu clock generator 275 may generate the etu clock signal ETU_CLK in accordance with the timing of the (k+2)-th elementary demodulated signal DO_k+2.

The combiner 277 may combine two selected signals, e.g., the (k+1)-th elementary demodulated signal DO_k+1 and the (k+2)-th elementary demodulated signal DO_k+2, and generate the final demodulated signal SOUT. Various examples of the final demodulated signal SOUT generated based on the (k+1)-th elementary demodulated signal DO_k+1 and the (k+2)-th elementary demodulated signal DO_k+2 are illustrated in FIGS. 14A through 14E.

For instance, when at least one of the (k+1)-th elementary demodulated signal DO_k+1 and the (k+2)-th elementary demodulated signal DO_k+2 has a level transition, the combiner 277 reflects it in the final demodulated signal SOUT. Accordingly, the final demodulated signal SOUT may transit from a logic high level to a logic low level when either of the (k+1)-th elementary demodulated signal DO_k+1 and the (k+2)-th elementary demodulated signal DO_k+2 transits from a logic high level to a logic low level. In addition, the final demodulated signal SOUT may transit from a logic low level to a logic high level when either of the (k+1)-th elementary demodulated signal DO_k+1 and the (k+2)-th elementary demodulated signal DO_k+2 transits from a logic low level to a logic high level.

The initialization signal generator may generate the initialization signals SET and RESET for initializing the first through n-th elementary demodulators 241_1 through 241_n based on a state signal and the final demodulated signal SOUT. To this end, the initialization signal generator includes the reset generator 281 and the set generator 282.

The reset generator 281 generates the reset signal RESET at a logic high level when the state signal indicates "SOF low" or "EOF low" and when a result of sampling the final demodulated signal SOUT using the etu clock signal ETU_CLK is continuously at a logic low level during 9 etus. The set generator 282 generates the set signal SET at a logic high level when recognizing "SOF high", "char end (or char stop)", or "RX fail" based on the state signal. The FSM 285 detects "SOF low", "SOF high", "char start", "char", "char end", "EOF low", "EOF high", or "RX fail" according to an Rx communication format for type B communication defined in the ISO/IEC 14443 standard and outputs the state signal.

Figure 15:
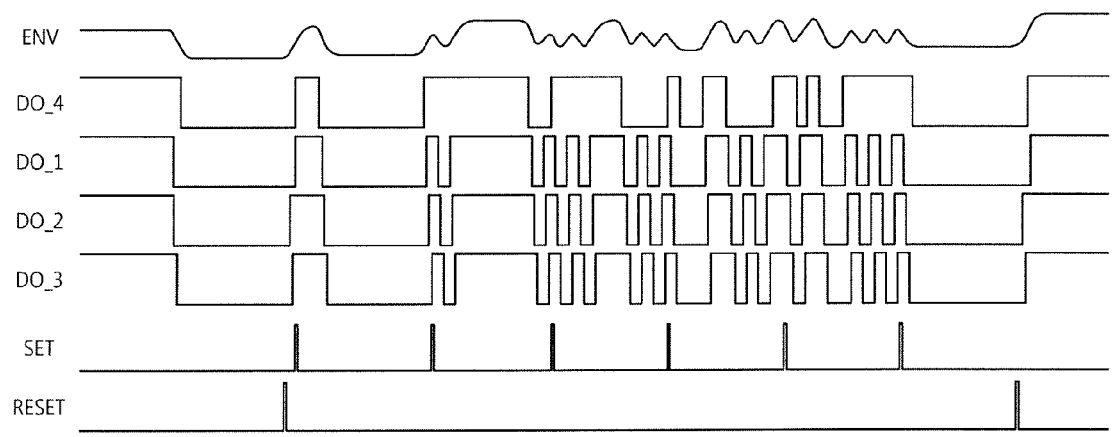
FIG. 15 is a timing chart illustrating an operation of the ASK demodulator illustrated in FIG. 10 when "n" is 4.

FIG. 15 is a timing chart illustrating an operation of the ASK demodulator 200B illustrated in FIG. 10 when "n" is 4. Referring to FIGS. 10 and 15, when the envelope signal ENV is as shown in FIG. 15, the first through fourth elementary demodulated signals DO_1 through DO_4 respectively output from the first through fourth elementary demodulators 241_1 through 241_4 may appear as shown in FIG. 15.

The post signal processor 270B may detect SOF, EOF, and EGT, and generate the set signal SET and the reset signal RESET, as illustrated in FIG. 15. Therefore, the first through fourth elementary demodulators 241_1 through 241_4 may respectively initialize the first through fourth elementary demodulated signals DO_1 through DO_4.

As described above, according to an exemplary embodiment of the present inventive concept, a plurality of elementary demodulated signals is generated by performing a plurality of times of sample-and-hold comparison on an envelope signal detected from an ASK modulated signal in a bit period and a final demodulated signal is generated using at least one of the elementary demodulated signals. Thus, noise and distortion of a signal may be reduced even when a data rate increases. For instance, distortion in timing information (e.g., timing jitter) may be reduced having a high signal-to-noise ratio (SNR) even at a high data rate (e.g., 6.8 Mbps which is a maximum communication speed in very high bit rate (VHBR) technology taken into the ISO/IEC 14443 standard), and therefore, reliability of demodulated signals may be increased.

Figure 17:
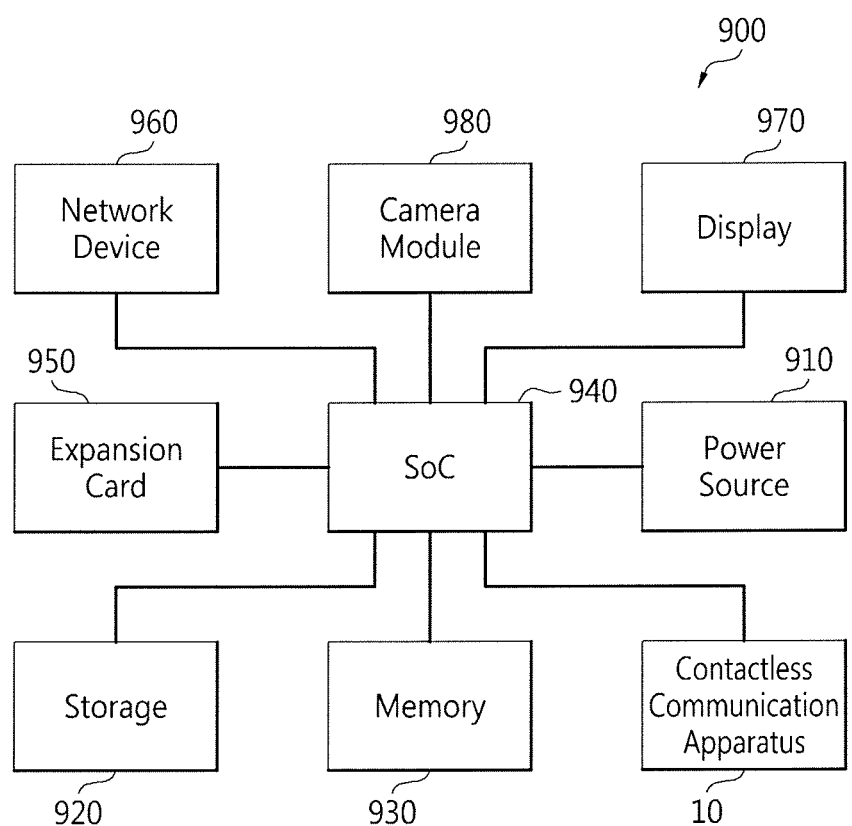
FIG. 17 is a block diagram of an electronic system including a communication apparatus according to an exemplary embodiment of the present inventive concept.

FIG. 17 is a block diagram of an electronic system including a communication apparatus according to an exemplary embodiment of the present inventive concept. Referring to FIG. 17, the electronic system 900 may be implemented as a personal computer (PC), a data server, a portable device, or the like.

The portable device may be a laptop computer, a cellular phone, a smart phone, a tablet PC, a personal digital assistant (PDA), an enterprise digital assistant (EDA), a digital still camera, a digital video camera, a portable multimedia player (PMP), portable navigation device (PND), a handheld game console, an e(electronic)-book device, or the like.

The electronic system 900 includes the communication apparatus 10, a system-on-chip (SoC) 940, a power source 910, a storage device 920, a memory 930, an expansion card 950, a network device 960, a display 970, or the like. The communication apparatus 10 may be the contactless communication apparatus 10, 20 or 10-1 illustrated in FIG. 1 or FIG. 2.

According to an exemplary embodiment, the electronic system 900 may further include a camera module 980.

The contactless communication apparatus 10 may be a smart card device or a smart card reader for reading information of the smart card device, which complies with the ISO/IEC 14443 standard.

The SoC 940 may control the operation of at least one of the elements 10, 910 through 980. The power source 910 may supply an operating voltage to at least one of the elements 10, and 910 through 980. The storage device 920 may be implemented by a hard disk drive (HDD) or a solid state drive (SSD).

The memory 930 may be implemented by a volatile or non-volatile memory. According to an exemplary embodiment of the present inventive concept, a memory controller (not shown) that controls a data access operation, e.g., a read operation, a write operation (or a program operation), or an erase operation, on the memory 930 may be integrated into or embedded in the SoC 940. In an exemplary embodiment of the present inventive concept, the memory controller may be provided between the SoC 940 and the memory 930.

The expansion card 950 may be implemented as a secure digital (SD) card or a multimedia card (MMC). The expansion card 950 may be a subscriber identity module (SIM) card or a universal SIM (USIM) card.

The network device 960 enables the electronic system 900 to be connected with a wired or wireless network. The display 970 displays data output from the storage device 920, the memory 930, the SoC 940, the expansion card 950, the network device 960, or the like.

The camera module 980 converts optical images into electrical images. Accordingly, the electrical images output from the camera module 980 may be stored in the storage device 920, the memory 930, the expansion card 950, or the like. In addition, the electrical images output from the camera module 980 may be displayed through the display 970.

While the present inventive concept has been particularly shown and described with reference to exemplary embodiments thereof, it will be understood by those of ordinary skill in the art that various changes in forms and details may be made therein without departing from the spirit and scope of the present inventive concept as defined by the following claims.

What is claimed is:

1. An amplitude shift keying (ASK) demodulator comprising:
an envelope detector configured to detect an envelope of an ASK modulated signal and to generate an envelope signal;

a clock generator configured to generate a main clock signal and first through n-th clock signals, where n is a positive integer of at least 2;

a plurality of elementary demodulators each configured to sample the envelope signal using a first sampling clock signal and a second sampling clock signal, and to output first through n-th elementary demodulated signals based on a difference between the sampled envelope signals using the first sampling clock signal and the second sampling clock signal; and a post signal processor configured to generate a final demodulated signal using at least one of the first through n-th elementary demodulated signals, wherein the main clock signal comprises n pulses in a predetermined unit period, wherein the first through n-th clock signals have different phases to one another and each of the first through n-th clock signals has a frequency equal to a 1/n frequency of the main clock signal.

2. The demodulator of claim 1, wherein the predetermined unit period is an elementary time unit (etu) or a bit duration time, the first and second sampling clock signals are selected from among the first through n-th clock signals, and the first through n-th clock signals are obtained by dividing the frequency of the main clock signal.

3. The demodulator of claim 1, wherein the clock generator generates the main clock signal and the first through n-th clock signals from a carrier signal of the ASK modulated signal.

4. The demodulator of claim 1, wherein the plurality of elementary demodulators comprises first through n-th elementary demodulators for outputting the first through n-th elementary demodulated signals, respectively, wherein the first sampling clock signal and the second sampling clock signal for the m-th elementary demodulator are the (m+1)-th clock signal and the m-th clock signal, respectively, among the first through n-th clock signals, where m is an integer in a range of 1 to n, and wherein the first sampling clock signal and the second sampling clock signals for the n-th elementary demodulator are the first clock signal and the n-th clock signal, respectively, among the first through n-th clock signals.

5. The demodulator of claim 1, wherein the post signal processor is configured to generate the final demodulated signal by selecting a signal from among the first through n-th elementary demodulated signals, or by combining at least two demodulated signals among the first through n-th elementary demodulated signals.

6. The demodulator of claim 4, wherein each of the first through n-th elementary demodulators comprises:

a sample-and-hold comparator configured to sample the envelope signal using the first and second sampling clock signals and to output a comparison result signal corresponding to the difference between the sampled envelope signals using the first sampling clock signal and the second sampling clock signal; and a latch configured to latch the comparison result signal output from the sample-and-hold comparator.

7. The demodulator of claim 6, wherein the post signal processor comprises:

a selector configured to select two demodulated signals from among the first through n-th elementary demodulated signals; and a combiner configured to generate the final demodulated signal by combining the selected two demodulated signals, wherein the selected two demodulated signals are the (k+1)-th elementary demodulated signal and the (k+2)-th elementary demodulated signal when the k-th elementary demodulated signal is an earliest elementary demodulated signal having a logic level transition among the first through n-th elementary demodulated signals, where k is an integer in a range of 1 to (n−2), wherein the selected two demodulated signals are the n-th elementary demodulated signal and the first elementary demodulated signal when the (n−1)-th elementary demodulated signal is an earliest elementary demodulated signal having a logic level transition among the first through n-th elementary demodulated signals, and wherein the selected two demodulated signals are the (n−1)-th elementary demodulated signal and the n-th elementary demodulated signal when the (n−2)-th elementary demodulated signal is an earliest elementary demodulated signal having a logic level transition among the first through n-th elementary demodulated signals.

8. The demodulator of claim 7, wherein the post signal processor further comprises:

a finite state machine configured to detect a start of frame (SOF), an end of frame (EOF), or an extra guard time (EGT) from the final demodulated signal and to generate a state signal; and an initialization signal generator configured to generate an initialization signal for initializing the first through n-th elementary demodulators based on the state signal and the final demodulated signal.

9. The demodulator of claim 8, wherein the initialization signal generator comprises:

a set signal generator configured to generate a set signal; and a reset signal generator configured to generate a reset signal, wherein the latch operates in response to the set signal and the reset signal.

10. A communication apparatus comprising:

an antenna;

a transmit module comprising an amplitude shift keying (ASK) modulator configured to perform ASK modulation on an input signal according to a control of a control logic; and a receive module comprising an ASK demodulator configured to receive an ASK modulated signal via the antenna and to demodulate the ASK modulated signal, wherein the ASK demodulator comprises:

an envelope detector configured to detect an envelope of the ASK modulated signal and to generate an envelope signal;

a plurality of elementary demodulators each configured to sample the envelope signal using a first sampling clock signal and a second sampling clock signal and to output first through n-th elementary demodulated signals based on a difference between the sampled envelope signals using the first sampling clock signal and the second sampling clock signal; and a post signal processor configured to generate a final demodulated signal using at least one of the first through n-th elementary demodulated signals, wherein the first and second sampling clock signals are selected from among first through n-th clock signals for sampling the envelope signal n times during a predetermined unit period, where n is a positive integer of at least 2.

11. The communication apparatus of claim 10, wherein the ASK demodulator further comprises a clock generator configured to generate a main clock signal and the first through n-th clock signals from a carrier signal of the ASK modulated signal,
wherein the main clock signal comprises n pulses in the predetermined unit period, and the first through n-th clock signals have different phases to one another and each of the first through n-th clock signals has a frequency equal to a 1/n frequency of the main clock signal.

12. The communication apparatus of claim 10, wherein the post signal processor is configured to generate the final demodulated signal by selecting a signal from among the first through n-th elementary demodulated signals, or by combining at least two demodulated signals among the first through n-th elementary demodulated signals.

13. The communication apparatus of claim 10, wherein the predetermined time period is an elementary time unit defined in an ISO/IEC 14443 standard, or a portion of the elementary time unit.

14. The communication apparatus of claim 10, wherein the communication apparatus is a smart card device or a smart card reader for reading information of the smart card device, which complies with the ISO/IEC 14443 standard.

15. The communication apparatus of claim 11, wherein the first through n-th clock signals are obtained by dividing the frequency of the main clock signal and the plurality of elementary demodulators comprises first through n-th elementary demodulators.

16. The communication apparatus of claim 12, wherein the post signal processor further comprises:
a finite state machine configured to detect a start of frame (SOF), an end of frame (EOF), or an extra guard time (EGT) from the final demodulated signal and to generate a state signal; and
an initialization signal generator configured to generate an initialization signal for initializing the plurality of elementary demodulators based on the state signal and the final demodulated signal.

17. The communication apparatus of claim 15, wherein the first sampling clock signal and the second sampling clock signal for the m-th elementary demodulator are the (m+1)-th clock signal and the m-th clock signal, respectively, among the first through n-th clock signals, where m is an integer in a range of 1 to (n−1),
wherein the first sampling clock signal and the second sampling clock signals for the n-th elementary demodulator are the first clock signal and the n-th clock signal, respectively, among the first through n-th clock signals.

18. The communication apparatus of claim 17, wherein each of the first through n-th elementary demodulators comprises:
a sample-and-hold comparator configured to sample the envelope signal using the first and second sampling clock signals and to output a comparison result signal corresponding to the difference between the sampled envelope signals using the first sampling clock signal and the second sampling clock signal; and
a latch configured to latch the comparison result signal output from the sample-and-hold comparator.

19. An amplitude shift keying (ASK) demodulator comprising first through n-th elementary demodulators, where n is a positive integer,
wherein an m-th elementary demodulator of the first through n-th elementary demodulators is configured to receive an envelope signal of an ASK modulated signal and to output a final demodulated signal,
wherein the m-th elementary demodulator comprises:
a sampler configured to sample the envelope signal using a first sampling clock signal and a second sampling clock signal; and
a comparator configured to determine a first difference between the sampled envelope signals using the first sampling clock signal and the second sampling clock signal, and to output a comparison result signal corresponding to the first difference between the sampled envelope signals,
wherein the comparator comprises:
a first comparator configured to output a logic high level when the first difference is a positive value; and
a second comparator configured to output a logic high level when the first difference is a negative value,
wherein the first sampling clock signal and the second sampling clock signal when m is an integer in a range of 1 to (n−1) are (m+1)-th clock signal and m-th clock signal, respectively, among first through n-th clock signals,
wherein the first sampling clock signal and the second sampling clock signals when m is equal to n, are the first clock signal and the n-th clock signal, respectively, among the first through n-th clock signals, and
wherein the first through n-th clock signals have different phases to one another and each of the first through n-th clock signals has a frequency equal to a 1/n frequency of a main clock signal.

20. The demodulator of claim 19, wherein the sampler comprises:
a first switch configured to bypass the envelope signal to a first node in response to a logic high level of the first sampling clock signal;
a second switch connected to the first switch in parallel, the second switch configured to bypass the envelope signal to the first node in response to a logic high level of the second sampling clock signal;
a capacitor connected between the first node and a second node; and
a third switch connected between the second node and a third node, the third switch configured to be turned on in response to a logic low level of the second sampling clock signal,
wherein the third node is applied with a reference voltage,
wherein the comparator is configured to determine the first difference using a voltage at the second node and the reference voltage at the third node.

* * * * *